United States Patent [19]
Overbury et al.

[11] 3,946,320
[45] Mar. 23, 1976

[54] SIGNAL PROCESSOR FOR DOPPLER TYPE NAVIGATION SYSTEM

[75] Inventors: Francis G. Overbury, Cuffley; Paul Barton, Bishops Stortford; Kevin M. Kelly, Sawbridgeworth, all of England

[73] Assignee: International Standard Electric Corporation, New York, N.Y.

[22] Filed: Feb. 27, 1975

[21] Appl. No.: 553,480

[30] Foreign Application Priority Data
Apr. 25, 1975 United Kingdom............... 18084/74

[52] U.S. Cl............................. 325/470; 343/113 R
[51] Int. Cl.²........................................... H04B 1/34
[58] Field of Search ........... 325/303, 304, 307, 332, 325/334, 335, 420, 422, 473, 474, 476; 343/5 DP, 109, 112 R, 113 R, 113 DE

[56] References Cited
UNITED STATES PATENTS
2,954,465 9/1960 White .......................... 325/334 X
3,537,008 10/1970 Lakatos ......................... 325/474 X
3,623,089 11/1971 Bossert ............................ 343/5 DP Primary Examiner—Benedict V. Safourek
Attorney, Agent, or Firm—William T. O'Neil

[57] ABSTRACT

A signal processing arrangement, particularly for Doppler ILS, giving complete scanning verification and tracking filter operation. Two commutated filters are driven by two voltage controlled oscillators whose roles are interchangeable. One filter is used solely for information signal tracking and the other solely for scanning. If the true signal is being tracked, the peak output from the scanning filter corresponds in amplitude and frequency to this signal and occurs at the same time as the frequency coincidence of the two oscillators. If the incorrect signal is being tracked, there is non-correspondance between the peak output and the signal being tracked. This is detected and the roles of the oscillators are interchanged, causing the oscillator which was scanning to reside on the correct signal and the other oscillator to adopt the scan program.

5 Claims, 17 Drawing Figures

3,946,320

SIGNAL PROCESSOR FOR DOPPLER TYPE NAVIGATION SYSTEM

BACKGROUND OF THE INVENTION

1. Field of the Invention

This invention relates to a signal processing arrangement having particular though not exclusive application in Doppler radio navigation systems where bearing information is coded in terms of frequency.

2. Description of the Prior Art

Doppler radio navigation systems have previously been described in British patents 1,225,190 and 1,234,541, and elsewhere in the technical literature. In such systems, a radio frequency source is commutated successively to the separate elements of a linear array of radiators, while a slightly offset frequency is transmitted from a reference antenna. Direction (angle of reception) from the array is basically defined by the frequency of the commutated wave emitted in that direction. In an azimuth system using a horizontal array, bearing information over a sector of typically ±60° normal to the axis of the array can be provided. Accordingly, the frequency-counting receivers of the co-operating remote (receiving) station must accept a band of frequencies corresponding to the complete sector of possible bearings. Such received bearing information signal does not consist of only the discrete information frequency (by direct propagation) but also includes multipath components (by reflection).

In the said system receiver, therefore, a signal processor is required to track the valid information signal spectrum, and to be able to discriminate against multipath signals.

To fulfill these requirements, the processor must provide scanning verification and narrow-band tracking filter facilities and in its application to Doppler radio navigation system receivers, the signal processing arrangement of the present invention must provide these functions.

The manner in which the present invention deals uniquely with these problems to provide a novel arrangement will be understood as this description proceeds.

SUMMARY OF THE INVENTION

According to the invention, a signal processing arrangement is provided, including two variable frequency oscillators, a circuit for coupling one of said oscillators to a first frequency selective network so as to form a frequency tracking filter arranged to track one frequency component of a multiple frequency component input signal by moving a relatively narrow frequency slot or "window", a circuit for coupling the other of said oscillators to a second frequency selective network so as to form a frequency scanning filter arranged to scan a predetermined frequency range repetitively, including that of the input signal, circuits associated with said frequency scanning filter for determining if there occurs during a said scan or during a sequence of said scans an input signal component of a frequency different from and of larger amplitude than that being tracked by said tracking filter, and apparatus responsive to such an occurrence to generate a control or "lock-on" signal thereby to cause interchange of the respective couplings of said oscillators with said networks such that at the instant of said interchange the frequency tracking filter is tuned to (and thereafter tracks) the frequency of the largest amplitude component.

The detailed implementation of this general statement of the invention will be understood as this description proceeds.

DESCRIPTION OF THE PREFERRED EMBODIMENT(S)

Two embodiments of the invention will now be described with reference to the accompanying drawings.

Figure 1:
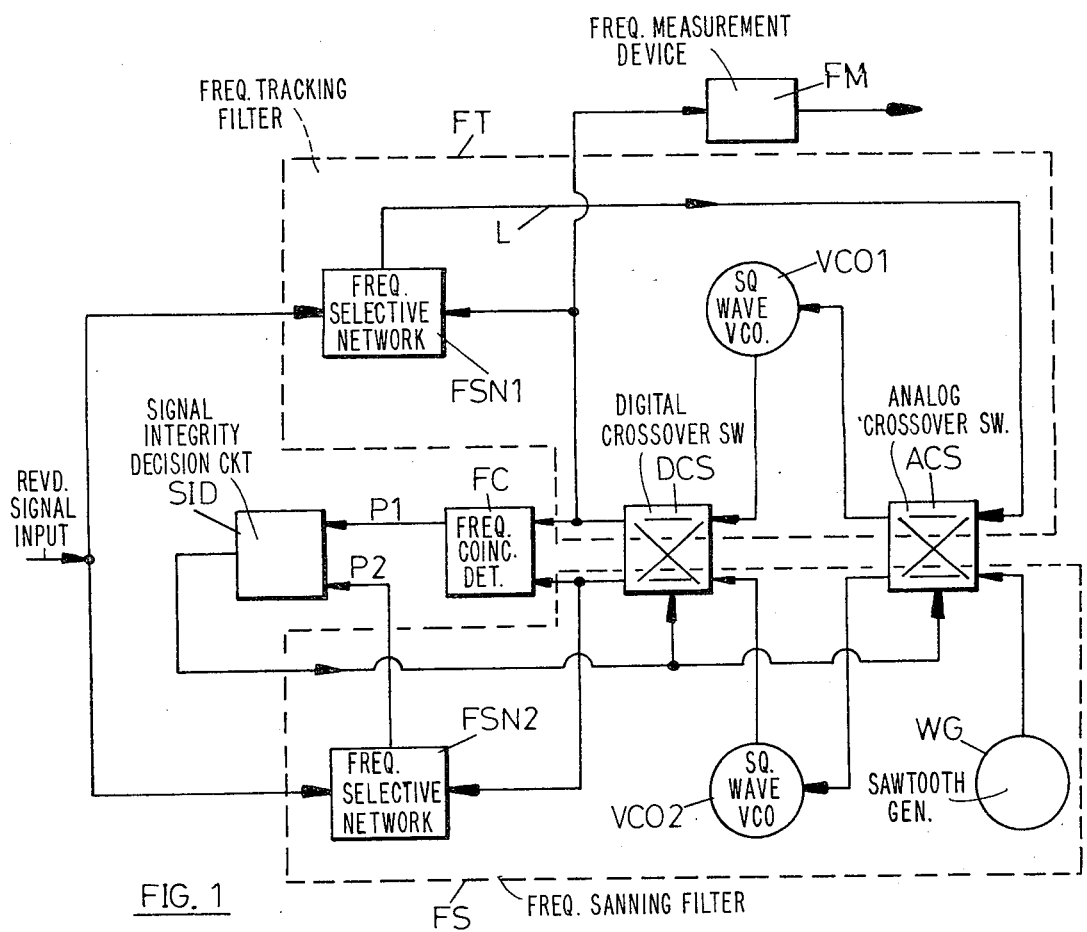
FIG. 1 shows a first embodiment and is a block schematic circuit diagram of a scanning verification and tracking filter for a Doppler landing guidance system receiver.

The receiver of which FIG. 1 is a part, derives the bearing signal to be processed by suitably processing the received radio frequency signals from the system transmitter beacon to obtain a Doppler beat frequency which is unique for a given bearing angle. A wideband filter passes all such processed signals which fall within the frequency band total sector of possible bearings, but inevitably this acceptance of a wide range of spectral components also results in acceptance of multipath components falling within the passband of the filter.

As already indicated, further processing of this Doppler signal requires acquisition and locking in to the true bearing frequency, and verification that the correct signal, and not a multipath signal, has been acquired. The criterion for establishing correct acquisition is that the true information signal component consistently has the largest amplitude.

Referring to FIG. 1, there are two VCO units (voltage controlled square wave oscillators) VCO1 and VCO2, each having their outputs connectable via a digital crossover switch DCS to either a first frequency selective network FSN1 or a second frequency selective network FSN2. The frequency control inputs of the two oscillators are connectable via an analog crossover switch ACS to either a tracking control voltage feedback signal on a lead L from the first network FSN1 or to a sawtooth frequency control waveform generator WG which, when coupled to the oscillator driving the search filter (as will be described later), causes repetitive scanning over the whole range of possible frequencies of the received input signal.

Let it be assumed that the two crossover switches ACS and DCS are set so that the oscillator VCO1 is coupled to the first network FSN1 and to the lead L, and that the oscillator VCO2 is coupled to the second network FSN2 and to the generator WG.

With this setting of the switches ACS and DCS, VCO1 and FSN1 constitute a frequency tracking filter as indicated by the dashed outline FT and VCO2 and FSN2 constitute a frequency scanning filter as indicated by the dashed outline FS.

The frequency tracking filter FT is of any suitable type which is brought into the "on-tune" condition, i.e., locked onto one frequency component of the multiple frequency component input signal, by appropriate variation of the frequency of the oscillator VCO1. In the "on-tune" condition, measurement of the frequency of VCO1 by a frequency measurement device FM gives an indication of the frequency of the signal component locked on to, and this information is passed on for suitable display of bearing angle.

A suitable form of tracking filter employing a voltage controlled oscillator is described in U.S. Pat. Application Ser. No. 382,957 filed 26, 25, 1973 (assigned to the assignee of the present application). Briefly, that device operates by using a variable frequency oscillator to beat the received signal to a predetermined fixed frequency of a narrow band filter network.

In another known form, there is an arrangement to sample the input signal over each scan period (commutated array scan period) four times per signal period under control of a variable frequency oscillator. The contributions from the first and third quadrant are then integrated on a capacitor (or on separate capacitors) and the second and fourth quadrant contributions are integrated on another capacitor (or on separate capacitors). At the end of the scan the steady state response of an equivalent delay line filter is available as the final voltages on the capacitors. These are then discharged, and another scan signal applied to form another steady state value at the scan end. This process is repeated indefinitely, with the steady state signals from a "sum" and "difference" filter cross-multiplied to provide error signals for the oscillator which controls the sampling rate.

Turning now to the frequency scanning filter FS, this device is basically operated under control of the sawtooth generator WG to sweep through the whole frequency range and to determine, during each sweep, when the largest amplitude component occurs.

Figure 2:
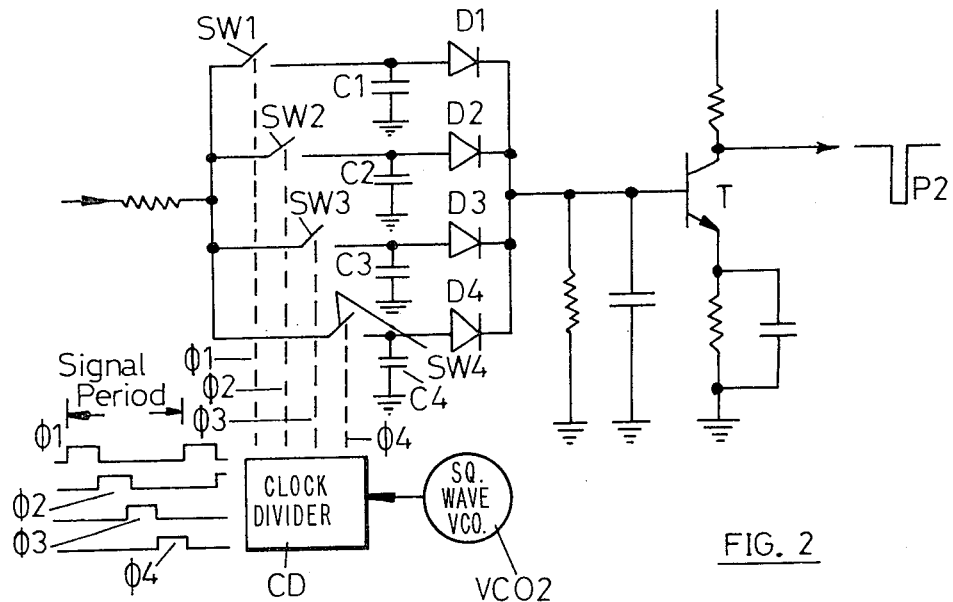
FIG. 2 shows circuit details of the scanning search filter according to the invention.

A typical circuit arrangement is shown in FIG. 2. The output from the oscillator VCO2 controls a four phase clock divider CD for sampling the input signal in successive quadrants every scan of the commutated array by the appropriate control of four switches SW1 to SW4, typically field effect transistors each gated on in turn by the divider CD via pulses 01 to 04. The search scan period, i.e., of the generator WG, is very much larger than the commutated array scan period of the ground beacon to which the device herein described responds, so that as the frequency of the oscillator VCO2 is varied over the search scan period, the whole input signal spectrum is sampled. The signal samples are stored in respective capacitors C1 to C4, and the largest amplitude signal component sampled during any one search scan establishes, via diodes D1 to D4, a detector voltage level at the base of a transistor T.

On the next scan, with a 1dB droop per search cycle of the detector level of the previous search scan, there is an output pulse P2 from the collector of T when the detector level is exceeded by the largest amplitude signal component occurring in this next scan. There is therefore produced a series of P2 pulses, one in each search scan, at the occurrence of the largest amplitude signal during the scan. Each P2 pulse will occur at the same time as frequency coincidence between the tracking oscillator VCO1 and the search oscillator VCO2, if the true signal is being tracked.

In order to establish when frequency coincidence occurs, the two oscillator frequencies are fed, between the switch DCS and the respective filter networks FSN1 and FSN2, to a frequency coincidence detector circuit FC which is arranged to produce a series of pulses P1 at frequency coincidence during each search scan.

Figure 3:
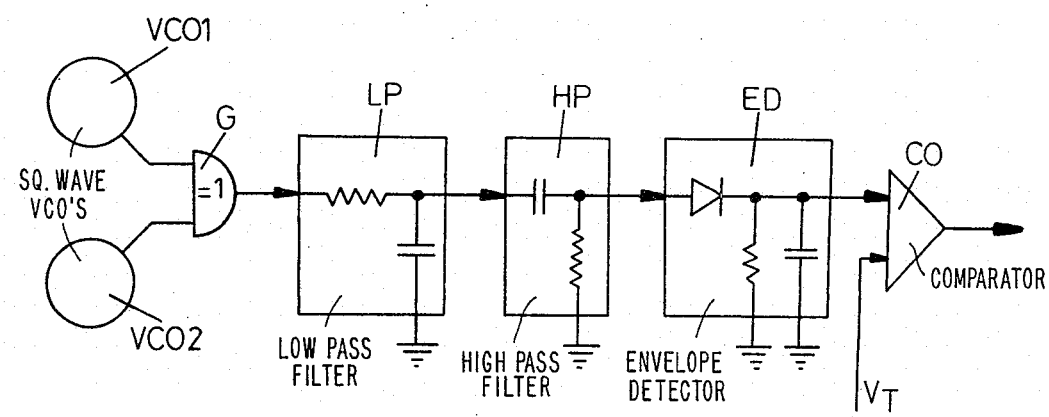
FIG. 3 shows circuit details of a frequency coincidence detector according to the invention.

A suitable frequency coincidence detector circuit is shown in FIG. 3, wherein the two oscillator frequencies are supplied as respective inputs to an exclusive OR gate G (digital equivalent of mixing). The output of the gate G is connected via a low pass filter LP, a high pass filter HP and an envelope detector ED to one input of a comparator CO, whose other input is a threshold voltage, $V_T$.

Figure 4:
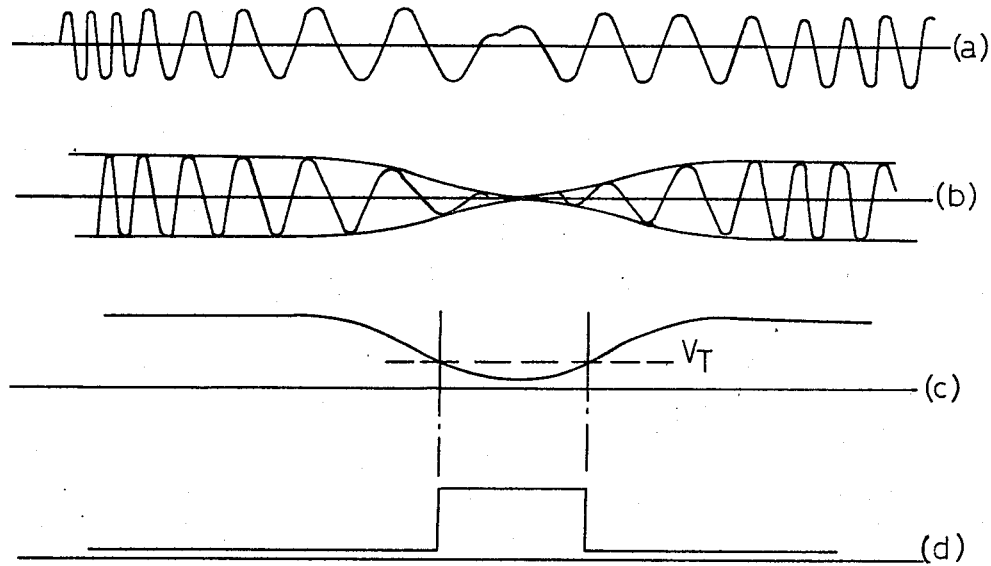
FIGS. 4(a) through 4(d) show waveforms for explaining operation of the detector of FIG. 3.

The oscillator VCO1 is operating at a fixed frequency, as it is locked on to a signal component. The other oscillator VCO2 is swept through the scanning frequency range and during each scan its frequency passes through that of the oscillator VCO1. FIG. 4(a) shows the lower sideband beat frequency waveform emerging from the low pass filter LP, the beat frequency tending to zero at frequency coincidence between the two oscillators. After the high pass filter HP the signal, FIG. 4(b), is passed into the envelope detector ED and when the envelope level, FIG. 4(c), falls to the level of the threshold voltage, the comparator CO delivers an output pulse P1, FIG. 4(d), at the instant of frequency coincidence between the two oscillators VC01 and VCO2.

The comparator therefore produces an output of a series of P1 pulses, one in each search scan, at the time of occurrence of frequency coincidence between the two oscillators VCO1 and VCO2.

Figure 5:
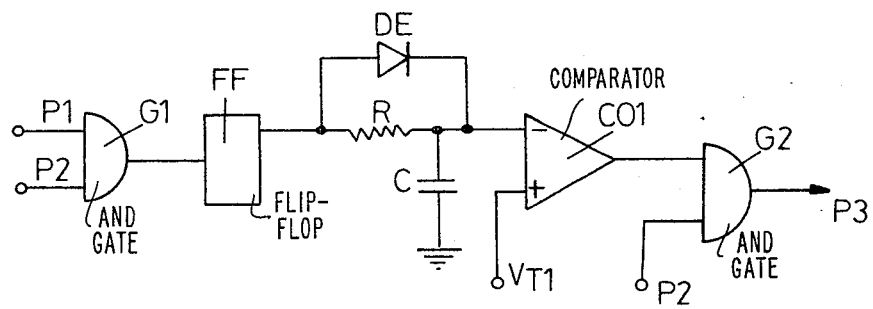
FIG. 5 shows circuit details of a signal integrity decision arrangement for use in the combination of the invention.

The two series of pulses P1 and P2 are fed to a signal integrity decision circuit SID which determines whether or not the P1 and P2 pulses are in coincidence. A suitable circuit for that function is shown in FIG. 5, and comprises an AND gate G1 to which the P1 and P2 pulses are applied, one to each input. FF is a flip-flop which is held at "1" by a repetitive reset pulse formed from the coincidence (overlap) of the P1 and P2 pulses. The flip-flop is connected via detector DE associated with a delay circuit RC to one input of a comparator CO1, the other input being connected to a threshold voltage $V_{T1}$. The comparator output is normally at 'O' and consequently the output of a second AND gate G2, having as inputs, the output of the comparator CO1 and the pulses P2, is held at 'O'.

If P1 and P2 do not overlap, FF is permitted to fall to 'O', and after a delay time determined by RC, the output of the comparator CO1 rises to "1" and at the next incidence of a P2 pulse and AND gate G2 will generate a pulse P3. This pulse P3 is effective to operate both changeover switches DCS and ACS so that the roles of the oscillators are interchanged. The purpose of the time delay is to provide "bright flash" immunity, i.e., the transient appearance of a multipath or other spurious signal of high amplitude which would otherwise cause incorrect operation.

The scanning verification and tracking sub-combination arrangement described above contains two commutated filters, one of which is used purely for information signal tracking and the other which is used in the scanning verifier. These filters are driven from two voltage controlled oscillators whose roles are interchangeable. The signal integrity decision is controlled by two input pulses. One of these, P1, is created by the frequency coincidence of the oscillators and the other, P2, which is produced by the largest component seen during the verification scan. If the true signal is being tracked, then the peak output from the scanning search filter occurs at the same time as the frequency coincidence of the oscillators. Hence, the criterion for proper track is that pulses P1 and P2 overlap. When the system is in correct track, the count output is taken directly from the respective oscillator. In principle, the two filters could have equal bandwidths, but then the search filter would have to be scanned extremely slowly so that signal components would not be missed, due to the inherent delay. The exact relationship between the filter bandwidths is determined by a number of factors.

Figure 6:
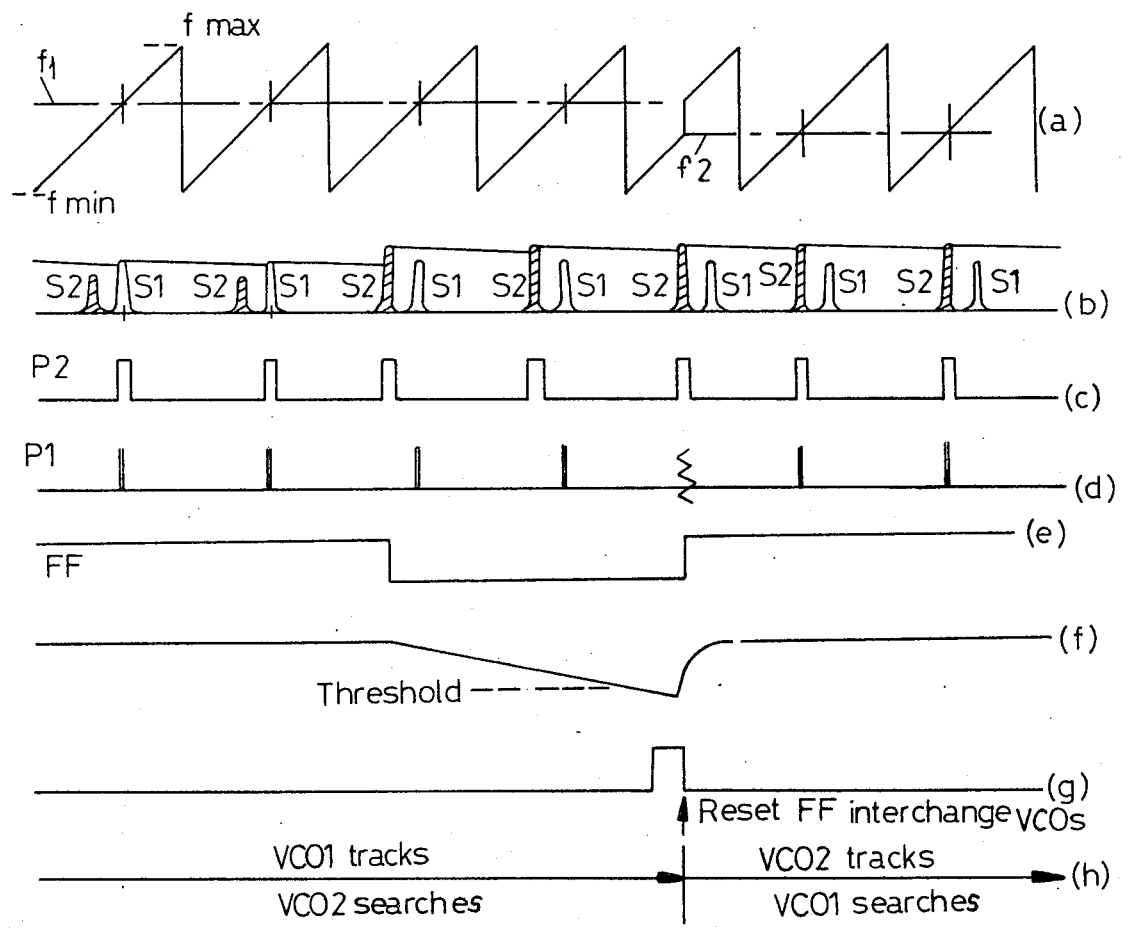
FIGS. 6(a) through (h) depict waveforms for explaining operation of the filter of FIG. 1.

The sequence of events occurring if the tracking filter is initially locked on to an incorrect signal, S1, is depicted in FIG. 6. The frequency of the scanning oscillator (VCO2) is shown by the sawtooth waveform, FIG. 6(a). Initially the tracking oscillator (VCO1) is at a constant frequency, $f_1$, since the system "sees" correct lock with signal S1, FIG. 6(b), i.e., P2 and P1 overlap, FIGS. 6(c) and 6(d). When the peak detector first registers signal S2 as being the largest signal in the sector, the flip-flop, FIG. 6(e), actuates a controlled voltage decay, FIG. 6(f). In the absence of a "bright flash", a threshold voltage is reached which causes reset of the flip-flop and the oscillators to be interchanged, the system being reset at a time determined by the next P2 pulse, FIG. 6(g). This causes the oscillator VCO2 which was scanning (see FIG. 6(h), to "home" on the correct component, at frequency $f_2$, (FIG. 6(a) and the other oscillator VCO1 to adopt the scan program. This interchange facility of the oscillators permits rapid acquisition. The scanning verification is not susceptible to the cumulative effect of spurious signals and noise throughout the whole sector but rather compares the energy of each component relative to the "tracked" signal.

The embodiment described above utilizes a verification procedure which will be quite satisfactory in a multipath situation where random transient "bright flashes" occur.

In a severe multipath situation there may be a continuous succession of bright flashes or glints from random directions, and it is important in such a situation that, once the verification circuit has indicated the necessity for reacquisition, tracking does not restart on a multipath signal which has significant persistence.

Ideally therefore, there is required a verification procedure which "looks for" the existence of a response persistent at one bearing. It is noted that, even if there is a continuous succession of multipath "glints", the bearing of these will change as the aircraft proceeds on course.

These requirements may be met by a verification procedure which effectively permits a history to be generated in terms of persistence and bearing stability.

Persistence is clearly a function of time but may also be weighted by amplitude according to some controlled law.

Figure 7:
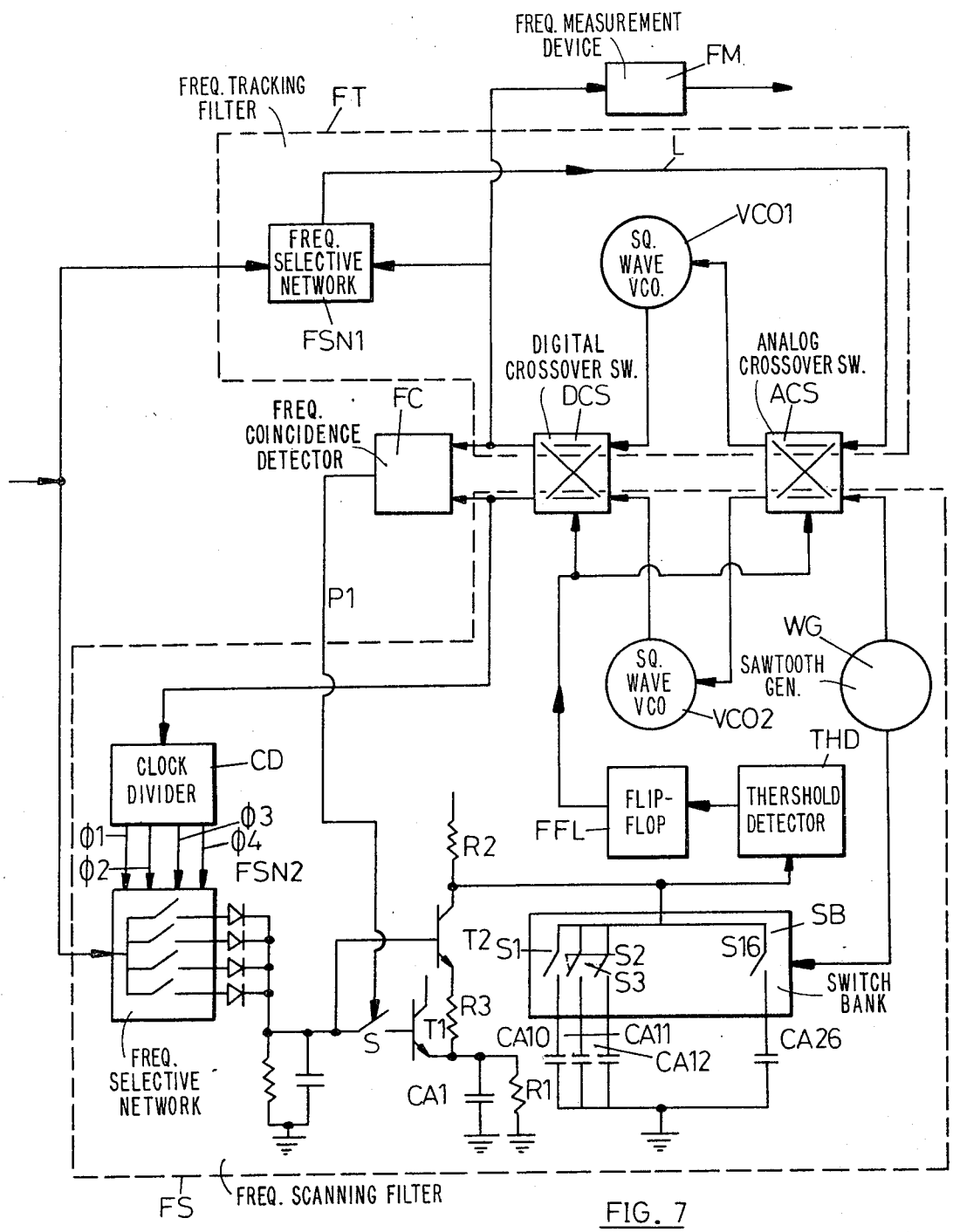
FIG. 7 shows a second embodiment of a scanning verification and tracking filter.

Bearing stability requires knowledge of bearing and, in the embodiment to be described and shown in FIG. 7, the approach is to split the sector into a number of sections, typically 16. In outline, only responses larger than that being tracked are recorded, these are graded in terms of persistence and isolated into one of the 16 sections. If certain criteria of persistence of these larger responses are exceeded, then the roles of the oscillators are interchanged to bring the tracking system into the new section for final acquisition.

Referring then to FIG. 7, in which like references have been used (where appropriate) to those used in the embodiment shown in FIG. 1. Let it be assumed, as before, that the variable frequency oscillator VCO1 is coupled with the first frequency selective network FSN1 and the lead L via the switches ACS and DCS so as to function as a frequency tracking filter which is locked onto a signal frequency $f_1$.

The frequency scanning filter, basically comprised of the sawtooth waveform generator WG, oscillator VCO2 and frequency selective network FSN2, sweeps through the whole frequency range.

The frequency coincidence detector circuit FC defines the moment in time (pulse P1) during each scan when the scanning filter (frequency of VCO2) is coincident with the tracking filter (frequency of VCO1). Pulse P1 causes momentary closing of a switch S to charge capacitor CA1 via transistor T1 to the peak value of the response which is being detected by the scanning filter. This value is held by CA1,R1 such that transistor T2 only conducts if the scanning filter finds responses in excess of that to which the tracking filter is tuned.

The sawtooth waveform generator WG additionally operates a switch bank SB, typically having FET "switches", in sequence, and with 16 of such switches S1, S2, etc., each coupling to a different capacitor, CA10, CA11 etc., the sector is divided into 16 sections in terms of which switch is closed as the generator WG scans the frequency range.

Any response in excess of that to which the tracking filter is tuned is thus recorded in the particular one of the capacitors CA10 through CA26, appropriate to its position in the sector. Dependent on the choice of R2, R3, and the capacitor values, persistence and level weighting can be applied.

If any one of the capacitors CA10 through CA26 becomes charged to more than a certain voltage indicating the presence of a persistent response of frequency $f_2$ on a fixed bearing, a threshold detector THD causes reset of flip-flop FFL resulting in actuation of the changeover switches ACS and DCS to interchange of the oscillators VCO1 and VCO2, transferring the tracking filter to the region of the dominant signal. The time of transfer is, of course, determined by the time (i.e., position in scan) that a capacitor CA10–26 with previous storage is switched across the threshold detector THD by the switch bank SB.

The term remote used hereinafter refers generally to the separation of ground Doppler navigation beacon and the airborne station at which the Doppler receiver of the invention is located. Thus, the ground beacon and the said receiver are remote from each other, although not necessarily for a long distance. Systems of the type are most useful for aircraft final approach and landing.

Modifications and variations will suggest themselves to those skilled in this art, once the principles of the invention are understood. Accordingly, it is not intended that the scope of the invention be limited to the drawings and this description, these being typical and illustrative only.

What is claimed is:

1. In a Doppler Navigation receiver for deriving angular position information from received signals transmitted from a remote commutated array ground beacon, signal processing apparatus for frequency tracking the direct path signal and avoiding the tracking of frequencies corresponding to multipath signals, comprising:

a frequency tracking circuit responsive to said received signals, said tracking circuit being responsive to a control signal to lock onto and track a discrete signal within the range of frequencies contained within said received signals;

a frequency scanning circuit for scanning said range of received signal frequencies, including detection means to generate said control signal at any time when a signal amplitude within said range of received signals exceeds the amplitude of said discrete signal being tracked at the same time by said frequency tracking circuit;

and switching means responsive to said control signal to cause at least a portion of said frequency scanning circuit to assume the role of frequency tracking, at least a portion of said frequency tracking circuit being controlled to contemporaneously assume the role of frequency scanning.

2. Apparatus according to claim 1 in which said frequency tracking circuit and said frequency scanning circuit include first and second controllable variable frequency oscillators respectively and first and second frequency selective networks respectively, said tracking and scanning circuits operating to move a relatively narrow frequency window in response to variation of the frequencies of said oscillators.

3. Apparatus according to claim 2 in which said frequency scanning circuit comprises a sawtooth generator for producing a scanning control signal and said oscillator of said frequency scanning circuit is responsive thereto to cause said frequency window to move in frequency throughout at least a portion of said range of received signal frequencies.

4. Apparatus according to claim 3 in which said detection means within said frequency scanning means includes frequency coincidence means responsive to the instantaneous frequency scanned and the frequency being tracked at any given time by said frequency tracking means to produce a first frequency coincidence pulse, additional means are included for generating a second pulse at a scan time corresponding to the frequency of the greatest amplitude received signal, and in which said switching means is adapted to interchange the roles of said scanning and tracking circuits whenever said first and second pulses do not occur substantially contemporaneously.

5. Apparatus according to claim 4 including signal persistence detection means associated with said additional means for evaluating the frequency of said greatest amplitude signal to provide for generation of said second pulse only if said frequency is substantially constant over a predetermined plurality of scan cycles of said ground beacon array commutations.

* * * * *